May 4, 1948.    H. A. LAND    2,440,775
SLIDING GEAR LOCK
Filed Dec. 26, 1944
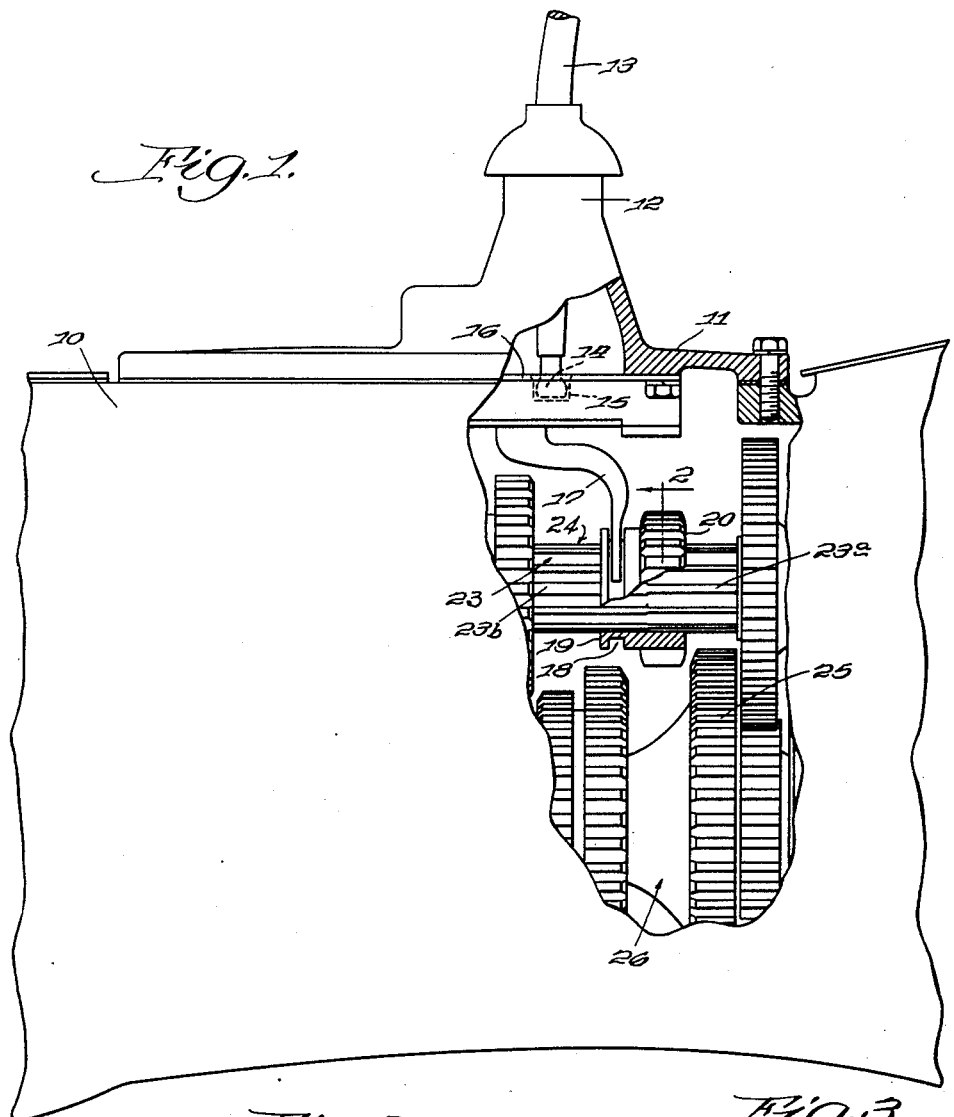
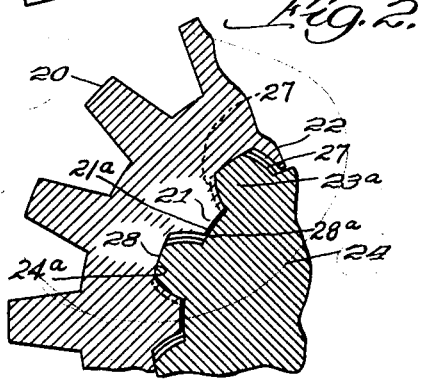
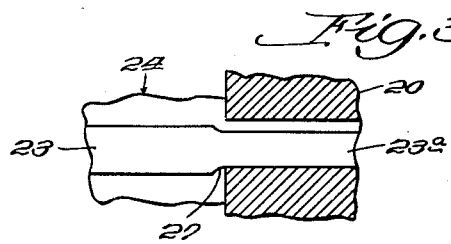
Inventor:
Harry A. Land.
By Paul O. Pippel
Atty.

Patented May 4, 1948

2,440,775

UNITED STATES PATENT OFFICE 2,440,775

SLIDING GEAR LOCK

Harry A. Land, Chicago, Ill., assignor to International Harvester Company, a corporation of New Jersey Application December 26, 1944, Serial No. 569,677

1 Claim. (Cl. 287—52.05)

1

This invention relates to a power-transmitting mechanism. More specifically it relates to a gear lock.

In the use of shifting gears for engagement and disengagement such as are widely used in transmissions for automotive vehicles difficulties are often encountered in maintaining the gears in engagement. Various theories have been advanced as to why the gears tend to creep out of engagement as theoretically there is no force acting in an axial direction which would tend to force the gears out of engagement. There is always a certain amount of eccentricity and out-of-roundness regardless of the accuracy of the machine operations. Apparently an action develops similar to that employed in the common expedients of removing a tightly fitting cork from a bottle. Any slight wobbling action of a gear splined on a shaft for axial sliding movement with respect thereto may have the result of developing a force tending to move the slidable gear in an axial direction. The force sometimes becomes so great that anchoring the shifter fork is not a practical solution due to the friction developed by engagement of the shifter fork with the gear.

The present invention contemplates a simple effective means of locking a gear against accidental displacement when a load is being applied thereto while permitting movement of the gear when very little load is being applied thereto. In principle the invention contemplates the use of a gear which closely fits in a radial direction on a spline shaft to maintain the gear in concentric driving relation while and at the same time undercutting the splines in a circumferential direction to provide abutting shoulders which positively hold the gear against axial movement when a substantial torque is being applied thereto.

In the drawings:

Figure 1 shows a section of an automotive vehicle transmission with a portion broken away in section to illustrate a sliding gear arrangement within the transmission;

Figure 2 is an enlarged sectional detail taken on the line 2—2 of Figure 1 showing the undercut portion of the splines; and Figure 3 is an enlarged detail showing the spline shaft with one of the splines in plan view and the adjacent portion of the gear hub in section.

A transmission housing 10 as shown in Figure 1 may be, for example, a portion of a tractor which is driven by an internal combustion engine and in which a change-speed gear mechanism is incorporated. A cover housing 11 includes an upwardly projecting housing 12 which provides a support for pivotally mounting a gear shift lever 13. Said gear shift lever extends within the transmission housing 10 and has a headed end portion 14 adapted to engage a notch 15 in a shifter rod 16. As is conventional in transmissions of this type, a plurality of shifter rods 16 are usually provided, the gear shift lever 13 being engageable with notches similar to the notch 15 formed in the shifter rods.

The shifter rod 16 is provided with a downwardly extending shifter fork 17 which is bifurcated at its lower end to engage a collar 18 formed in the extending hub 19 of a toothed gear 20. Said gear is splined internally, the keys or splines being designated by the reference character 21 and the spaces between the splines being designated by the reference character 22. Said splines fit between splines 23 formed on a power transmitting shaft 24, whereby said gear 20 is mounted for axial sliding movement on the shaft 24.

The gear 20 is adapted to mesh as illustrated with a gear 25 which is one of several of a gear cluster 26, said gear cluster including a plurality of additional gears which form a part of the power-transmitting mechanism.

In Figure 1, the gear 20 is shown in neutral or non-driving position. It will be understood that the gear is shiftable by the gear shift lever 13 to the right into meshing engagement with the gear 25. It will be noted that the righthand portions of the splines 23 on the shaft 24, as shown in Figure 1, are indicated as being substantially thinner than the main portion of the teeth. This thinner portion will be identified by the reference character 23ᵃ. The reduced portion 23ᵃ extends to the right a sufficient distance so that the extension hub 19 on the gear 20 slides over those portions 23ᵇ of the splines or keys 23 having normal cross-section and past shoulders 27 formed at the junction of the portions 23ᵇ and the reduced portions 23ᵃ. For the purpose of illustration, the difference in circumferential widths between the spline portions 23ᵃ and 23ᵇ has been greatly exaggerated. In actual practice this difference amounts to only a few thousandths of an inch. The shoulder 27 would probably, therefore, not be visible to the eye except by reflected light and be hardly more than perceptible to touch. Figures 2 and 3 have been exaggerated in proportion relatively more than Figure 1 to show the shoulders 27 and the manner in which they operate to prevent the gear from creeping out of driving position. As the spaces 22 between the keys or splines 21 on the gear 20 are of the width of the spline portions 23ᵇ on the shaft, said spaces are substantially greater in circumferential width than the spline portions 23ª. After the gear 20 has been moved into engaging position with the gear 25 and driving torque is applied to said gears, the gear 20 assumes the position shown in Figures 2 and 3. If driving torque is in an opposite angular direction, the same general principle will move the other side of the keys 21 into engagement with the spline portions 23ª, whereby a lock will be effected by the shoulders 27 at the other side of the splines. It will be understood that with driving torque applied to the gears, the gear 20 will be held against axial movement by engagement with the shoulders 27 even though these shoulders are only a few thousandths of an inch in circumferential measurement. It will also be evident that when driving torque is not being applied to the gears, the back lash between the gear teeth and the tolerance necessary for sliding fits will permit the operator to slide the gear 20 over the shoulders 27 onto the spline portions 23ᵇ.

In the construction of splines as used to a great extent in modern practice, concentricity is obtained by the centering action of the splines on a shaft with respect to the splines on the gear. It is obvious that with the large amount of clearance provided in a circumferential direction in the present construction, concentricity cannot be obtained by fitting action of the splines on their radially extending faces. It is, therefore, necessary in this construction to provide a very close sliding fit between circumferential faces at the tips of the splines on one member and root faces on the other member between its splines. Such circumferential faces on the splines are indicated at 21ª and 24ª respectively on the gear and shaft while the root faces are indicated at 28 and 28ª. This close sliding fit might be used for both sets of circumferential faces and the root faces opposed thereto radially of the shaft. However, such construction would require very accurate fitting, and it is only necessary to fit one set of the circumferential faces with their opposed root faces on the other member. As illustrated, the root faces 28 are closely fitted on the circumferential faces 24ª between the splines 23. This fitting is such as to hold the gear in concentric position on the shaft 24 and to hold it on an axis parallel with the axis of the shaft 24. This particular fitting either at the circumferential faces of the splines 23 or at the circumferential faces of the splines 21 is an essential and significant feature of the present construction.

Applicant claims as his construction all modifications of gear locking mechanism falling withing the scope of the appended claim.

What is claimed is:

In a power transmission mechanism, a rotatable shaft having a set of splines of greater width circumferentially of the shaft at one portion thereof than at an axially adjacent portion to provide shoulders on said splines coincident with the junction of said shaft portions, there being root faces on the shaft between said splines and circumferential faces on the radially outer sides of said splines, a gear having a set of internal splines meshed with the shaft splines and slidable axially of the shaft selectively from either of such portions to the other while maintaining the meshed relation of said splines, there being root faces on the gear between its splines and circumferential faces on the radially inner sides of such splines, said gear being slidably carried on the shaft exclusively by the engagement of the root faces of at least one of said spline sets with the circumferential faces of the other set, to maintain a coaxial relation between the gear and shaft irrespective of the shaft portion occupied by the gear and to facilitate limited relative rotation of the gear and shaft to axially align end portions of the gear splines with said shoulders while the gear occupies the axially adjacent shaft portion.

HARRY A. LAND.

REFERENCES CITED

The following references are of record in the file of this patent:

UNITED STATES PATENTS

| Number | Name | Date |
|---|---|---|
| Re. 18,261 | Whitney | Nov. 24, 1931 |
| 1,379,214 | Richards | May 24, 1921 |
| 2,070,140 | Peterson et al. | Feb. 9, 1937 |
| 2,245,078 | Padgett | June 10, 1941 |
| 2,334,958 | Rohkar | Nov. 23, 1943 |